United States Patent
Yoshida et al.

(10) Patent No.: US 8,456,035 B2
(45) Date of Patent: Jun. 4, 2013

(54) POWER SUPPLY CONTROLLER

(75) Inventors: Teiji Yoshida, Fuchu (JP); Tomotake Gondai, Fuchu (JP); Koichi Kibe, Tsukuba (JP); Hiroaki Kusawake, Tsukuba (JP); Hitoshi Naito, Tsukuba (JP); Go Segami, Tsukuba (JP)

(73) Assignees: NEC TOSHIBA Space Systems, Ltd., Tokyo (JP); Japan Aerospace Exploration Agency, Tokyo (JP)

( * ) Notice: Subject to any disclaimer, the term of this patent is extended or adjusted under 35 U.S.C. 154(b) by 249 days.

(21) Appl. No.: 12/741,558

(22) PCT Filed: Nov. 6, 2008

(86) PCT No.: PCT/JP2008/070634
§ 371 (c)(1),
(2), (4) Date: May 5, 2010

(87) PCT Pub. No.: WO2009/060996
PCT Pub. Date: May 14, 2009

(65) Prior Publication Data
US 2010/0244565 A1    Sep. 30, 2010

(30) Foreign Application Priority Data

Nov. 9, 2007  (JP) ................................ 2007 291582

(51) Int. Cl.
*H02J 7/34* (2006.01)
*H01M 10/44* (2006.01)
(52) U.S. Cl.
USPC ............ 307/48; 307/130; 307/139; 307/140; 320/101; 323/271

(58) Field of Classification Search
None
See application file for complete search history.

(56) References Cited

U.S. PATENT DOCUMENTS

| | | | | |
|---|---|---|---|---|
| 3,896,368 A | * | 7/1975 | Rym | 323/224 |
| 4,175,249 A | * | 11/1979 | Gruber | 323/271 |
| 4,186,336 A | * | 1/1980 | Weinberg et al. | 323/223 |
| 4,306,183 A | * | 12/1981 | Wright | 320/101 |
| 6,157,161 A | * | 12/2000 | Canter et al. | 320/101 |
| 6,181,115 B1 | | 1/2001 | Perol et al. | |
| 6,246,219 B1 | * | 6/2001 | Lynch et al. | 323/223 |
| 2003/0038616 A1 | * | 2/2003 | Capel et al. | 323/288 |

FOREIGN PATENT DOCUMENTS

| | | |
|---|---|---|
| JP | 60-013442 A | 1/1985 |
| JP | 61-75412 A | 4/1986 |
| JP | 61-076022 A | 4/1986 |
| JP | 63-129817 A | 6/1988 |
| JP | 1-214236 A | 8/1989 |

(Continued)

OTHER PUBLICATIONS

Extended European Search Report, dated Sep. 27, 2012, issued by the European Patent Office in counterpart European Application No. 08846564.6.

(Continued)

*Primary Examiner* — Hal Kaplan
(74) *Attorney, Agent, or Firm* — Sughrue Mion, PLLC

(57) ABSTRACT

Main arrays (MA1-MAm) of solar cells (2) are provided so as to correspond to shunt circuits (SM1-SMm), respectively. Charge arrays (CA1-CAn) are provided so as to correspond to shunt circuits (SC1-SCn) and charging circuits (CH1-CHn), respectively. Each shut circuit operates independently from other shunt circuits, and each charging circuit operates independently from other charging circuits.

7 Claims, 5 Drawing Sheets

FOREIGN PATENT DOCUMENTS

| | | |
|---|---|---|
| JP | 11-150887 A | 6/1999 |
| JP | 2001-298874 A | 10/2001 |
| JP | 2000-134824 A | 5/2002 |
| JP | 2005-071244 A | 3/2005 |

OTHER PUBLICATIONS

Capel A et al: "Comparative performance evaluation between the S4R and the S3R regulated bus topologies", 32nd Annual IEEE Power Electronics Specialists Conference. PESC 2001. Conference Proceedings. Vancouver, Canada, Jun. 17-21, 2001; [Annual Power Electronics Specialists Conference], New York, NY: IEEE, US, vol. 4, Jun. 17, 2001, pp. 1963-1969, XP010559226, DOI: 10.1109/PESC.2001.954409 ISBN: 978-0-7803-7067-8.

Blanes J M et al: "Modeling the Sequential Switching Shunt Series Regulator", IEEE Power Electronics Letters, IEEE Service Center, New York, NY, US, vol. 3, No. 1, Mar. 1, 2005, pp. 7-13, XP011128775, ISSN: 1540-7985, DOI: 10.1109/LPEL.2005.845163.

O'Sullivan D et al: "The Sequential Switching Shunt Regulator S3R", Proceedings of the ESTEC Spacecraft Power Conditioning Seminar, XX, XX, Sep. 21, 1977, pp. 123-131, XP009020315.

O'Sullivan D: "Space power electronics—Design Drivers", E.S.A. Journal, ESA Publications Division, ESTEC, NL, vol. 18, No. 1, Jan. 1, 1994, pp. 1-23, XP001155349, ISSN: 0379-2285.

* cited by examiner

US 8,456,035 B2

POWER SUPPLY CONTROLLER

TECHNICAL FIELD

This invention relates to a power supply controller, and more particularly, to a power supply controller for controlling power supply from a plurality of solar cell arrays and a battery to a load.

BACKGROUND ART

As illustrated in FIG. 5, an associated power supply controller is connected to a solar cell 51, a battery 52, and a load 53, and includes (a plurality of) shunt circuits 54, a driver circuit 55, a charging circuit 56, and a discharging circuit 57.

In the power supply controller, an output voltage (bus voltage) of the solar cell 51 is stabilized by the shunt circuit 54 to be supplied to the load 53, and supplied to the charging circuit 56 to charge the battery 52. In order to realize constant current and constant voltage control, the charging circuit 56 includes a switching regulator (battery charge regulator (BCR)).

The operation of the shunt circuit 54 and the charging circuit 56 is controlled by the driver circuit 55 having a redundant circuit structure with high failure resistance. When the output power of the solar cell 51 exceeds load power and then a voltage of a capacitor bank (which is not shown and connected in parallel with load) increases, the driver circuit 55 first causes the charging circuit 56 to be turned ON to charge the battery 52 with excess power. When the excess power increases, the driver circuit 55 causes the shunt circuit 54 to be tuned ON to consume the excess power (by short circuit). When the output power of the solar cell 51 is smaller than the load power, power is supplied from the battery 52 to the load 53 through the discharging circuit 57 (for example, discharge diode).

The power supply controller illustrated in FIG. 5 is of a type frequently used for mainly a low-earth orbit satellite having a large charging current (see Patent Document 1).

There is another associated power supply controller as illustrated in FIG. 6. The power supply controller illustrated in FIG. 6 is connected to not only the solar cell 51, the battery 52, and the load 53 but also a solar cell (charge array) 61 for only charging and includes a charging circuit 62 having a simple switch instead of the charging circuit 56 illustrated in FIG. 5.

The battery 52 is charged by the solar cell 61 for only charging through the charging circuit 62. When the battery 52 is fully charged and the charging circuit 62 is turned OFF, power from the solar cell 61 may be supplied to the load 53.

The power supply controller illustrated in FIG. 6 is of a type frequently used for mainly a geostationary orbit satellite having a small charging current (see Patent Document 1).

In any of the power supply controllers described above, the plurality of shunt circuits are controlled by the single driver circuit 55. There is a power supply controller in which a plurality of shunt circuits are separately controlled by respective driver circuits (see, for example, Patent Document 2).

Further, there is a power supply controller in which a portion of a solar cell (array) for supplying power to a load is also used to charge a battery (see, for example, Patent Document 3).

Patent Document 1: Japanese Unexamined Patent Application Publication (JP-A) No. 2000-134824

Patent Document 2: Japanese Unexamined Patent Application Publication (JP-A) No. 2005-71244

Patent Document 3: Japanese Unexamined Patent Application Publication (JP-A) No. Sho 60-13442

DISCLOSURE OF THE INVENTION

In recent years, a power supply controller for artificial satellite has been required to have a small size, light weight, high reliability, and low cost. However, in the power supply controller illustrated in FIG. 5, the shunt circuits and the charging circuit are intensively controlled by the driver circuit having the redundant structure to avoid a total loss due to the failure of a single part, and hence there is a problem that the driver circuit is complicated and thus it is difficult to realize a small size, light weight, and low cost. In a case where short-term rapid charging is necessary, such as a case of the low-earth orbit satellite, there is also a problem that a large-scale charging circuit is required so as to fully charge the battery without stress.

The power supply controller illustrated in FIG. 6 has a problem that it is difficult to perform large-current rapid charging without stress to the battery because the charging circuit is simple but cannot perform constant voltage charging. In addition, the power supply controller has a problem that the output power of the solar cell reduces because a charge array voltage during charging lowers to substantially a battery voltage.

The power supply controller described in Patent Document 2 does not include the battery, and hence the problems on charging as described above may not be solved.

In the power supply controller described in Patent Document 3, the shunted outputs of the solar cell array are supplied to the battery, and hence there is a problem that a charging current changes depending on a state of the load and thus stable charging may not be performed.

Therefore, it is an object of this invention to provide a power supply controller which realizes at least one of (1) a point that a shunt circuit and a charging circuit are reduced in size and weight, (2) a point that the shunt circuit and the charging circuit are modularized and improved in reliability, (3) a point that full charge may be achieved by large-current rapid charging without stress to a battery, (4) a point that generated powers of solar cells are not reduced even during charging of the battery, and (5) charging power may be supplied to a load after the completion of the charging.

In order to achieve the above-mentioned object, according to one aspect of this invention, there is provided a power supply controller for controlling power supply from a plurality of solar cell arrays and a battery to a load and controlling charging of the battery using the plurality of solar cell arrays, including: a plurality of shunt circuits provided so as to correspond to the plurality of solar cell arrays, respectively, for controlling power supply from the corresponding solar cell array to the load; and one or more charging circuits provided so as to correspond to a part or all of the plurality of solar cell arrays, respectively, for controlling the charging of the battery using the corresponding solar cell array, in which the plurality of shunt circuits and the one or more charging circuits are separately and independently operated based on preset threshold values.

According to one aspect of this invention, the shunt circuits and the charging circuit are separately and independently operated based on the preset threshold values. Therefore, (1) a driver circuit (redundant structure) for the shunt circuits and the charging circuit may be omitted and reduced in size and weight. In addition, (2) the shunt circuits and the charging circuit are electrically separated from one another and thus are not affected by failure, and are easily modularized and thus easily provided corresponding to an increase and reduction in treatment power. Further, (3) a charging current may be reduced stepwise with an increase in battery voltage, and hence the full charge may be achieved by the large-current rapid charging without stress to the battery. Further, (4) the charging circuit may be on-off controlled to stabilize a bus voltage, and hence the generated powers of the solar cells are not reduced even during the charging of the battery (SHNT mode and BCC mode). Further, (5) after the completion of the charging, the charging circuit may be stopped to supply the charging power to the load.

BEST MODE FOR EMBODYING THE INVENTION

Hereinafter, embodiments of this invention are described with reference to the attached drawings.

Figure 1:
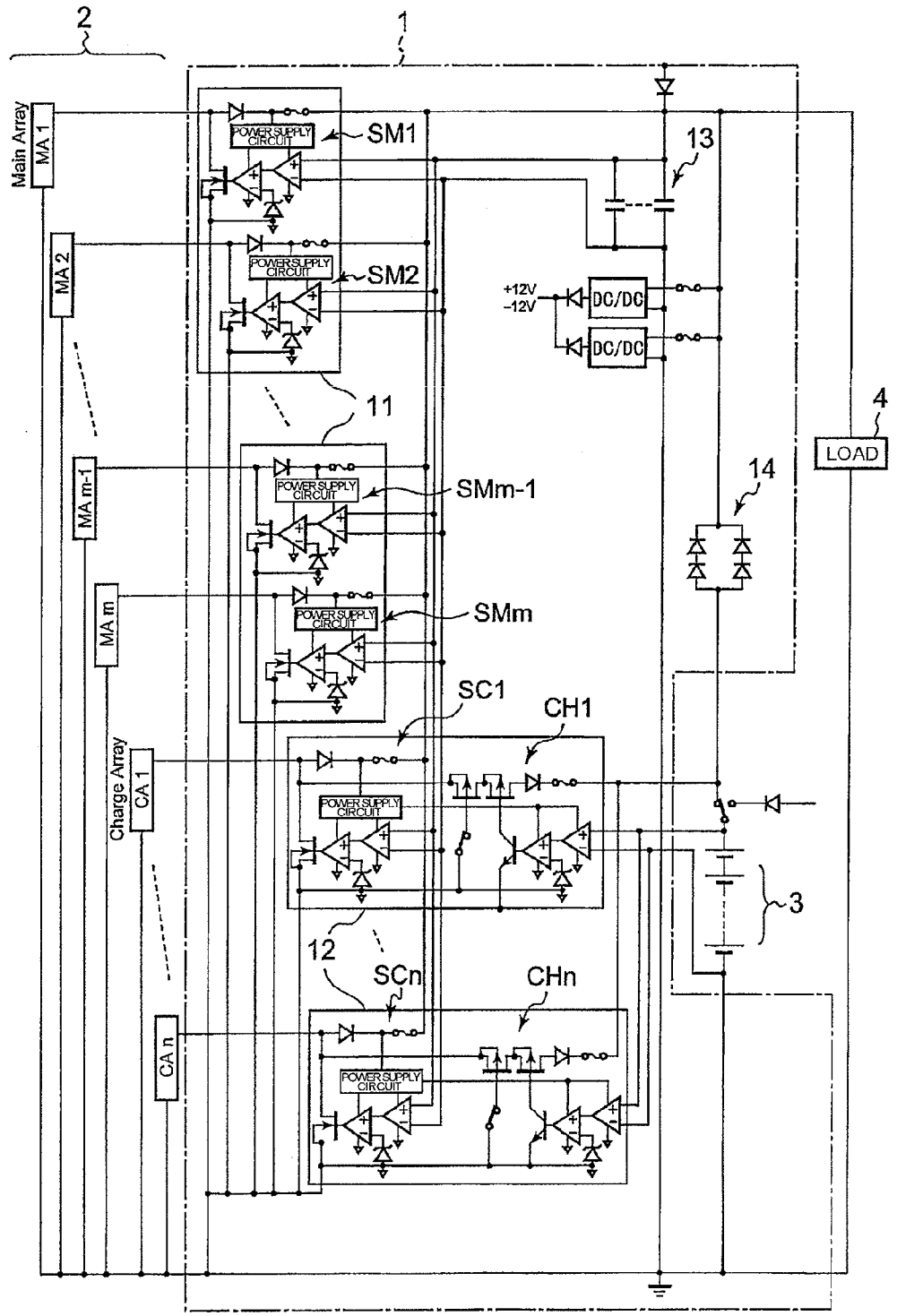
FIG. 1 is a circuit diagram illustrating a structure of a power supply controller according to a first embodiment of this invention.

FIG. 1 illustrates a circuit structure of a (distributed control type) power supply controller 1 according to a first embodiment of this invention. The power supply controller 1 is used for a power supply system and device using a solar cell and a battery as power sources, particularly, for a power supply system of a space craft such as an artificial satellite.

The power supply controller 1 is connected to a plurality of solar cells 2, a battery 3, and a load 4 and includes a plurality of MA modules 11, a plurality of CA modules 12, a capacitor bank 13, and a discharge diode 14.

The MA modules 11 each include two shunt circuits which are modularized. Shunt circuits SM1 to SMm (m is natural number) are separately connected to corresponding main arrays MA1 to MAm of the plurality of solar cells 2, which are used for only power supply to the load 4. Each of the shunt circuits includes a diode, a fuse, a power supply circuit, an operational amplifier, a comparator, a transistor switch, and a Zener diode. Each of the shunt circuits is electrically separated from the other shunt circuits and independently operates based on a preset threshold value.

CA modules 11 each include a shunt circuit and a charging circuit which are modularized. The CA modules 11 are separately connected to corresponding charge arrays CA1 to CAm of the plurality of solar cells 2, which are used for both power supply to the load 4 and power supply to the battery 3. Respective shunt circuits SC1 to SCn (n is natural number) included in the CA modules 11 have the same structure as the shunt circuits SM1 to SMm of the MA modules 11 and each are electrically separated from the other shunt circuits (without making distinction between MA modules 11 and CA modules 12). Each of charging circuits CH1 to CHn includes a pair of transistor switches, a diode, a fuse, an operational amplifier, a comparator, a transistor, a Zener diode, and a switch. Each of the charging circuits is electrically separated from the other charging circuits and independently operates based on a preset threshold value.

The shunt circuits SM1 to SMm of the MA modules 11 and the shunt circuits SC1 to SCn of the CA modules 12 are connected common to a capacitor bank 13, detect a voltage (bus voltage) of the capacitor bank, and perform an on-off (switching) operation based on a detected voltage. When the threshold values preset for the shunt circuits SM1 to SMm and SC1 to SCn are made different from one another, the shunt circuits SM1 to SMm and SC1 to SCn may be turned on or off with different voltages from one another (for example, one by one in order) depending on a change (increase/decrease) in bus voltage.

The charging circuits of the CA modules 12 are connected common to the battery 3 and perform an on-off operation based on a voltage of the battery 3. When the threshold values preset for the charging circuits are made different from one another, the charging circuits may be turned on or off with different voltages from one another (for example, one by one in order) depending on a change in battery voltage.

The power supply controller 1 broadly operates as follows.

When the total of the output powers of the solar cells (MA1 to MAm and CA1 to CAn) 2 exceeds the power consumption of the load 4, the plurality of MA modules 11 and the plurality of CA modules 12 which are electrically separated stabilizes the bus voltage to a specified voltage and charges the battery 3 up to the specified voltage.

When the total of the output powers of the solar cells (MA1 to MAm and CA1 to CAn) 2 is smaller than the power consumption of the load 4, power is supplied from the battery 3 to the load 4 through the discharge diode 14.

When the total of the output powers of the solar cells (MA1 to MAm and CA1 to CAn) 2 exceeds the power consumption of the load 4 and the voltage of the capacitor bank 13 increases, the charging circuits CH1 to CHn included in the CA modules 12 connected to the solar cells (CA1 to CAn) 2 are turned on in this order (order corresponding to CA1 to CAn) to charge the buttery 4 with excess power, to thereby stabilize the bus voltage. When the total of the output powers of the solar cells (MA1 to MAm and CA1 to CAn) 2 further increases, the shunt circuits SM1 to SMm included in the MA modules 11 connected to the solar cells (MA1 to MAm) 2 are turned on in this order (order corresponding to MA1 to MAm) to reduce (consume) excess power by short circuit, to thereby stabilize the bus voltage.

When the battery 4 is charged and then the voltage thereof increases, the charging circuits CH1 to CHn included in the CA modules 12 are turned off in the reversed order (order corresponding to CAn to CA1). When the charging circuits CH1 to CHn are turned off to increase the excess power and then the bus voltage increases to be equal to or larger than an operating voltage of the shunt circuits SM1 to SMm included in the MA modules 11, the shunt circuits SC1 to SCn included in the CA modules 12 are turned on in the reversed order to reduce the excess power by short circuit, to thereby stabilize the bus voltage.

According to the power supply controller 1 in this embodiment, a driver circuit for intensively controlling the shunt circuits and the charging circuits is not provided and a large-scale charging circuit (BCR) is not used, and hence (1) the shunt circuits and the charging circuits may be reduced in size and weight and the shunt circuits and the charging circuits are not affected by failure because all the circuits are separated from one another, and (2) the shunt circuits and the charging circuits are easily modularized and improved in reliability.

Next, the operation of the power supply controller 1 is described in detail with reference to FIG. 2.

Figure 2:
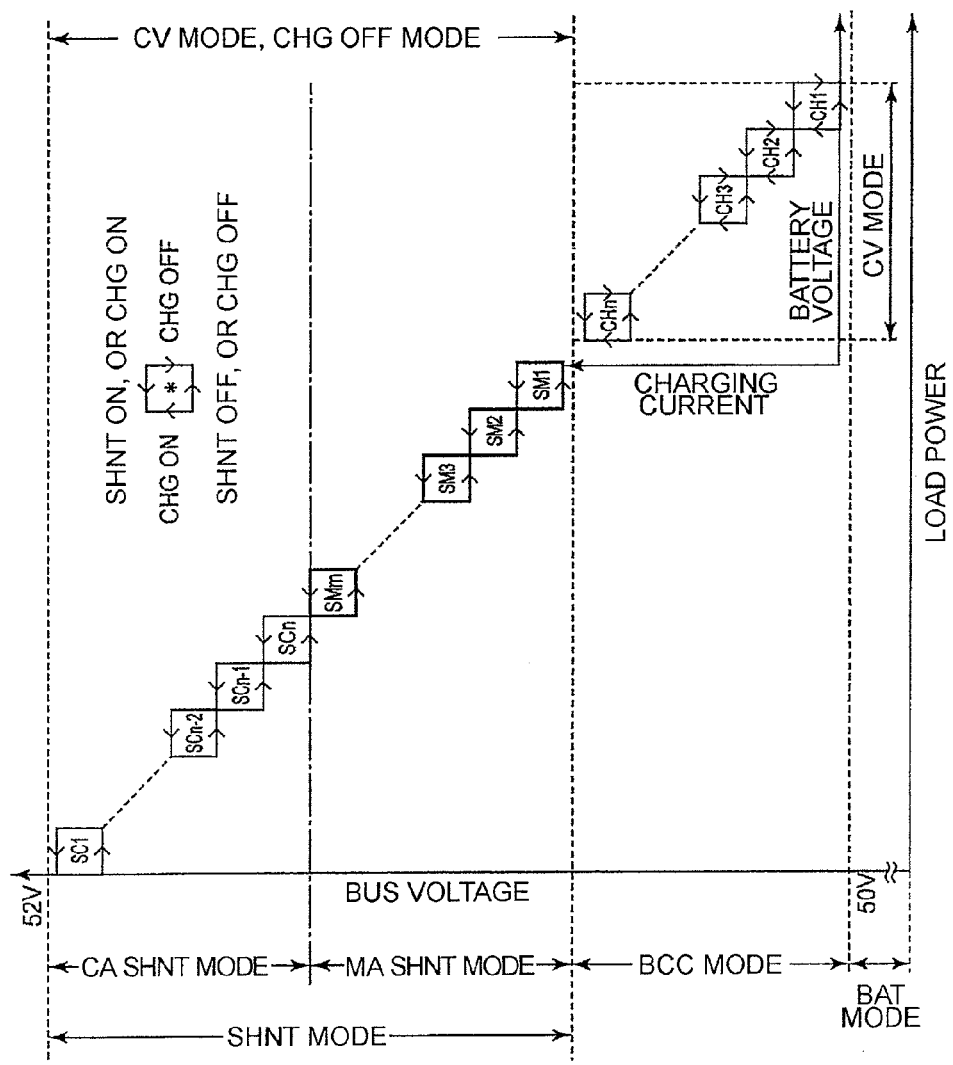
FIG. 2 is an explanatory operating sequence diagram illustrating operations of shunt circuits and charging circuits which are included in the power supply controller illustrated in FIG. 1.

FIG. 2 is a view illustrating an operating sequence on the shunt circuits SM1 to SMm and SC1 to SCn and the charging circuits CH1 to CHn in the power supply controller 1.

The charging circuits CH1 to CHn and the shunt circuits SM1 to SMm and SC1 to SCn are turned on and off with a hysteresis sufficiently narrower in width than the bus voltage. For example, when a bus ripple standard is 500 mVpp, a hysteresis voltage of 100 mVpp to 250 mVpp is provided such that a variation in voltage becomes equal to or smaller than the standard, preferably ½ or smaller.

On-off threshold voltages for the charging circuits CH1 to CHn and the shunt circuits SM1 to SMm and SC1 to SCn are set in advance from a lower value with respect to the bus voltage in an order of the charging circuits CH1 to CHn (BCC mode), the shunt circuits SM1 to SMm corresponding to the solar cells (MA1 to MAm) 2 (MA SHNT mode), and the shunt circuits SCn to SC1 corresponding to the solar cells (CA1 to CAn) 2 (CA SHNT mode).

When such setting is made, only one circuit having a (on-side or off-side) threshold voltage equal to the bus voltage under a power condition is turned on or off, and hence a circuit having a threshold voltage lower than the bus voltage is in an on state and a circuit having a threshold voltage higher than the bus voltage is in an off state.

Based on the setting, the charging circuits CH1 to CHn are turned on and off with a hysteresis somewhat wider in width than the battery voltage. The on-off threshold voltages are set from a lower value with respect to the battery voltage in an order of the charging circuits CHn to CH1 (CV mode). When the battery is charged to increase the battery voltage, an off-operation is performed in the order of the charging circuits CHn to CH1. The operation corresponds to a charging method of reducing the charging current stepwise as the battery voltage approaches the specified voltage, and hence (3) full charge may be achieved by large-current rapid charging without stress to the battery.

Next, the operation of the power supply controller 1 is described with reference to FIG. 3 in addition to FIG. 2. Assume that the solar cells 2 include five main arrays MA1 to MA5 and five charge arrays CA1 to CA5 and the power supply controller 1 includes the MA modules 11 (shunt circuits SM1 to SM5) and the CA modules 12 (shunt circuits AC1 to SC5 and charging circuits CH1 to CH5) corresponding to the main arrays MA1 to MA5 and the charge arrays CA1 to CA5.

Figure 3:
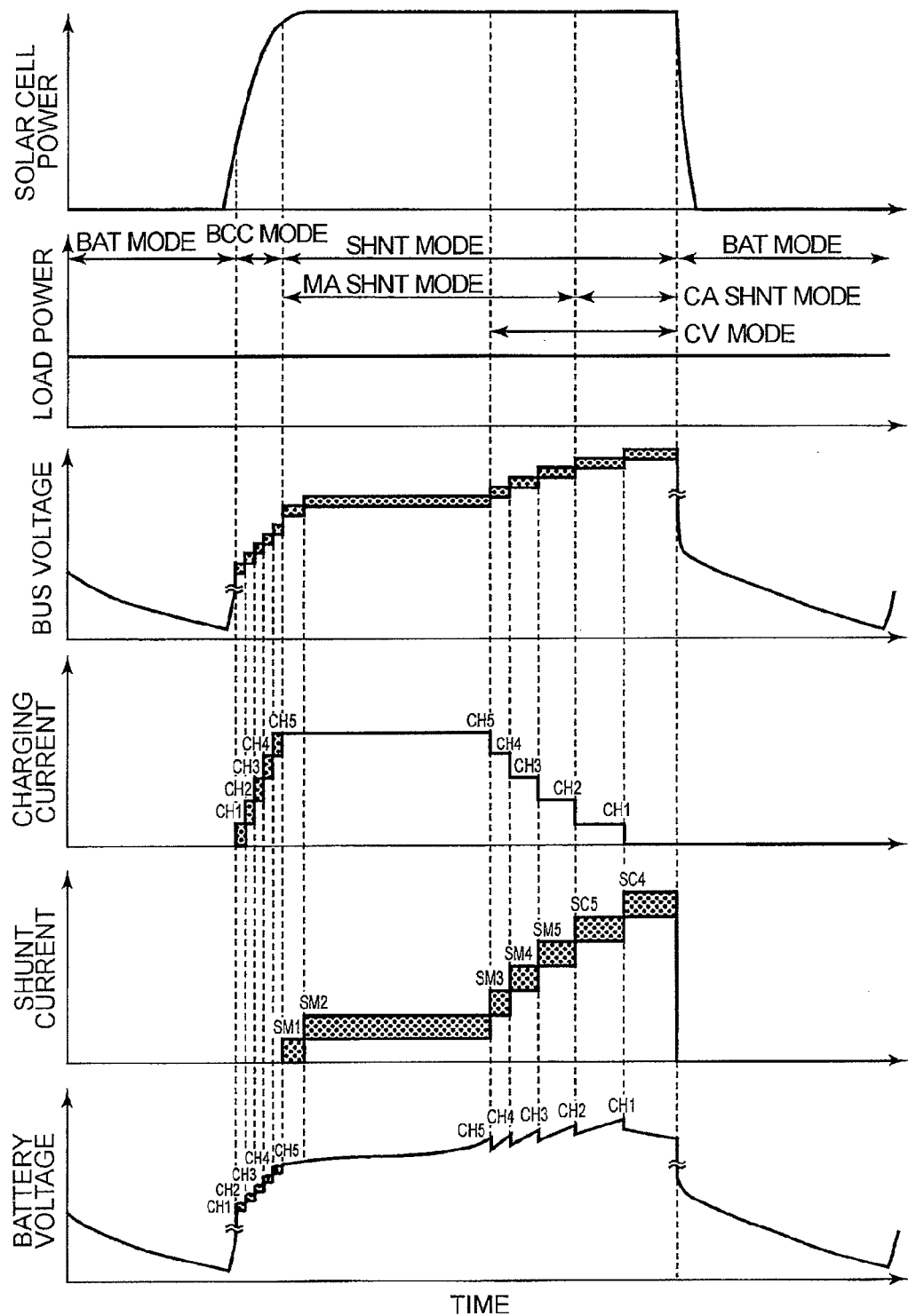
FIG. 3 is an explanatory schematic diagram illustrating an operation of the power supply controller illustrated in FIG. 1.

FIG. 3 is a schematic diagram illustrating the operation of the power supply controller 1. When power supply from the solar cells 2 to the battery 3 and the load 4 is controlled based on the operating sequence illustrated in FIG. 2, the operation as illustrated in FIG. 3 is performed based on sunshine/shade modes of the solar cells and the charging state of the battery. Hereinafter, the operation is described in detail.

In the shade mode, the solar cells 2 do not generate power, and hence the power supply controller 1 becomes a BAT mode in which the battery 3 is discharged. In this case, the shunt circuits and the charging circuits do not operate.

During an initial period in the sunshine mode, the output powers of the solar cells 2 increase. When the output powers of the solar cells 2 exceed the load power, the discharging of the battery 4 is stopped and then the bus voltage starts to increase. In other words, the power supply controller 1 is shifted to a BCC mode.

When the output powers of the solar cells 2 further increase, the battery 4 starts to be charged based on the bus voltage. In other words, in order to charge the battery 4 with excess power, the charging circuit CH1 starts to perform the on-off switching operation. In this case, the charging circuits CH2 to CH5 and all the shunt circuits SM1 to SM5 and SC1 to SC5 are in the off state.

After that, with the increase in output powers of the solar cells 2, the charging circuit CH1 becomes the on state and the charging circuit CH2 starts to perform the on-off switching operation. Then, the charging circuit CH2 becomes the on state and the charging circuit CH3 starts to perform the on-off switching operation. In such a manner, the charging circuit which performs the on-off switching operation is switched. In FIG. 3, hatching areas exhibit the on-off switching states of the respective circuits.

In the mode in which the charging circuits CH1 to CH5 perform the on-off switching operation (BCC mode), the bus voltage is controlled to a voltage higher than the battery voltage, and hence (4) the generated powers of the solar cells 2 are not reduced even during the charging of the battery.

When the output powers of the solar cells 2 further increase and then the charging circuit CH5 becomes the on state, the power supply controller 1 is shifted to a shunt mode. When the bus voltage reaches a predetermined voltage, the shunt circuit SM1 becomes the on state through a state in which the shunt circuit SM1 performs the on-off switching operation, and the shunt circuit SM2 becomes an on-off switching operation state. Until this state (MA SHNT mode), the battery continues to be charged while all the charging circuits CH1 to CH5 are in the on state.

After that, when the battery voltage is increased by charging, the charging circuit CH5 is turned off and the excess power increases. In order to consume the excess power (by short circuit), the shunt circuit SM2 becomes the on state and the shunt circuit SM3 starts to perform the on-off switching operation. When the battery voltage further increases, the charging circuits CH4 to CH1 are turned off in order, and hence the circuit which performs the on-off switching operation is shifted in an order of the shunt circuits SM4, SM5, SC5, and SC4.

In this case, even when the load power increases, the excess power increased by the turning off of the charging circuits CH5 to CH1 may be supplied to the load 4. That is, (5) the charging power may be supplied to the load after the completion of the charging.

When the sunshine mode is completed and the shade mode starts, the output powers of the solar cells 2 become smaller than the load power, and hence the bus voltage reduces, all the charging circuits CH1 to CH5 and the shunt circuits SM1 to SM5 and SC1 to SC5 are stopped, and power is supplied from the battery 4 to the load 4 through the discharge diode 14.

As described above, by using the distributed control type power supply controller according to this embodiment, (1) the driver circuit (redundant structure) for the shunt circuits and the charging circuit may be omitted and reduced in size and weight.

(2) The shunt circuits and the charging circuit are electrically separated from one another and thus are not affected by failure, and are easily modularized and thus easily provided corresponding to an increase and reduction in treatment power.

(3) The charging current may be reduced stepwise with an increase in battery voltage, and hence the full charge may be achieved by the large-current rapid charging without stress to the battery.

(4) The charging circuit may be on-off controlled to stabilize the bus voltage in the BCC mode, and hence the generated powers of the solar cells are not reduced even during the charging of the battery (SHNT mode and BCC mode).

(5) After the completion of the charging, the charging circuit may be stopped to supply the charging power to the load.

Next, a power supply controller according to a second embodiment of this invention is described with reference to FIG. 4.

Figure 4:
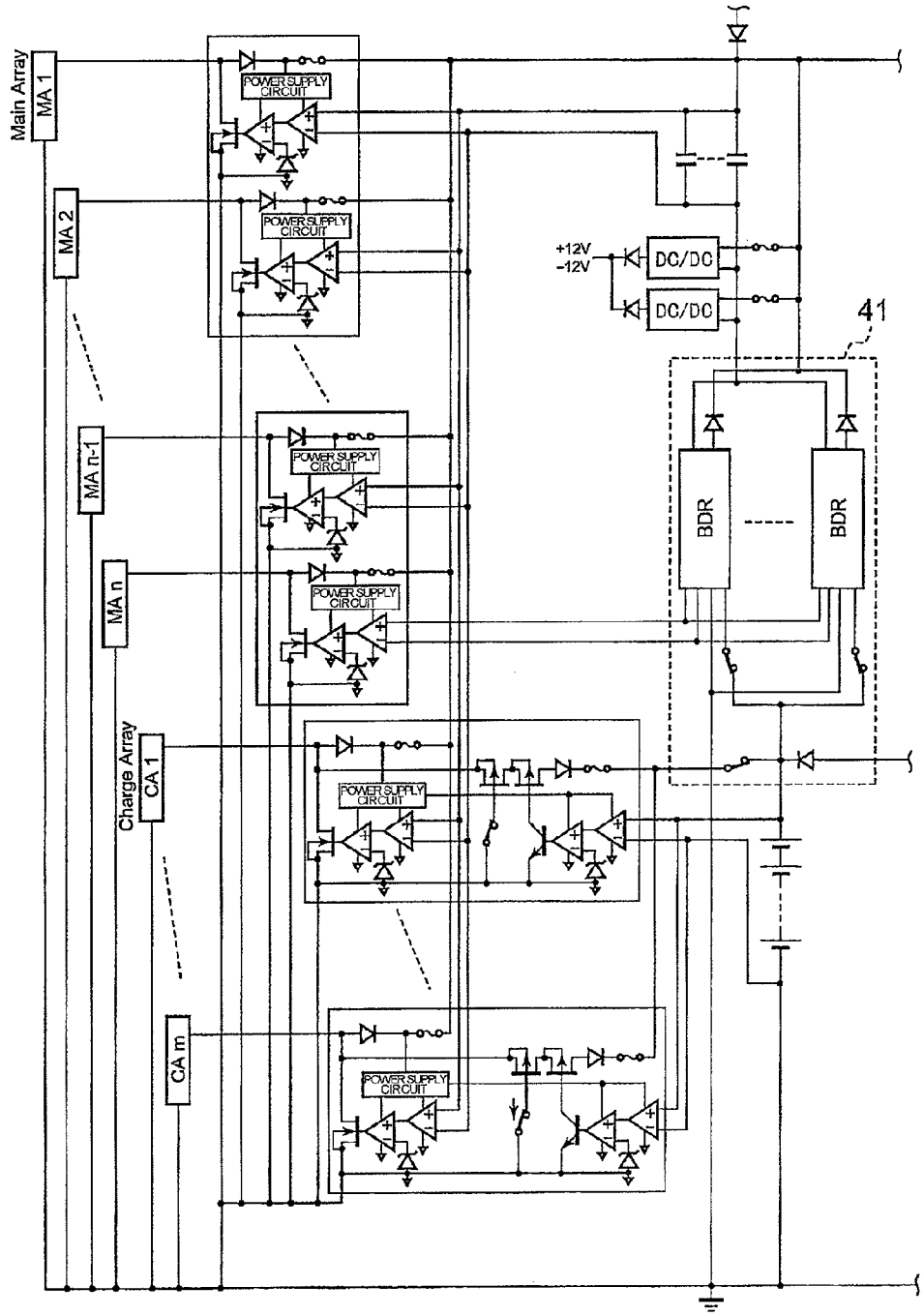
FIG. 4 is a circuit diagram illustrating a structure of a power supply controller according to a second embodiment of this invention.
Figure 5:
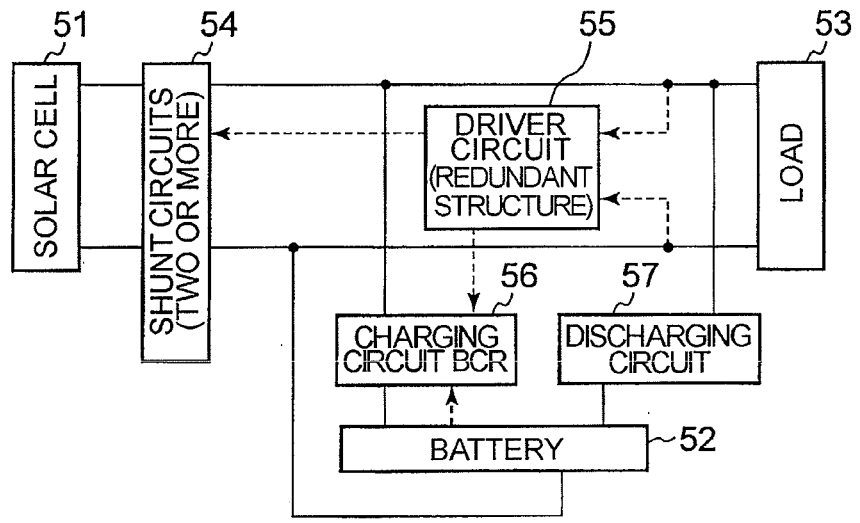
FIG. 5 is a block diagram illustrating an example of an associated power supply controller.
Figure 6:
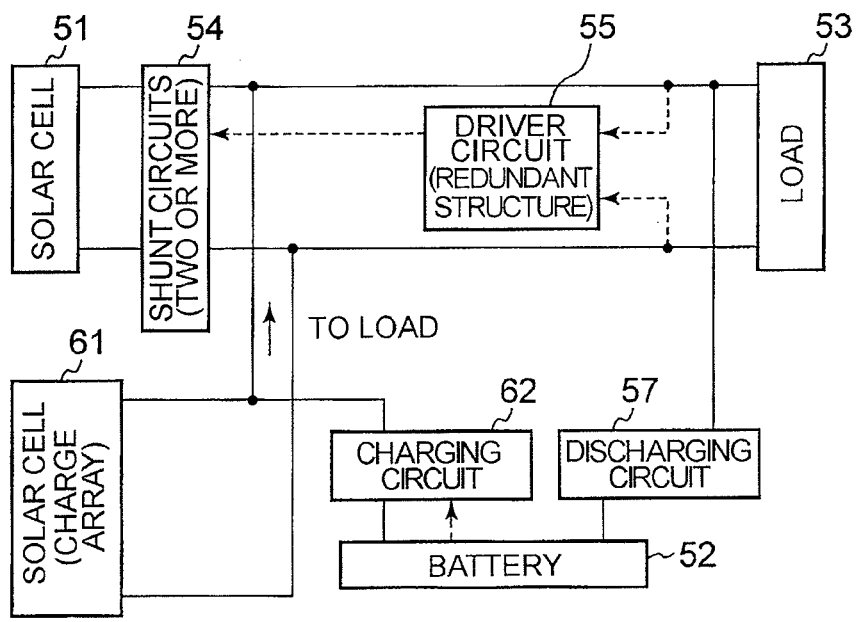
FIG. 6 is a block diagram illustrating another example of the associated power supply controller.

The power supply controller illustrated in FIG. 4 is a power supply controller in which the discharge diode 14 illustrated in FIG. 1 is replaced by a battery discharge regulator (BDR) unit 41. Even in the shade case (BAT mode), the stabilization may be achieved so as to obtain substantially almost the same bus voltage as in the sunshine case by the action of the BDR unit 41.

As described above, this invention is described based on the embodiments. However, this invention is not limited to the embodiments and thus various modifications and changes may be made without departing from the scope of the invention.

This application claims priority from Japanese Patent Application No. 2007-291582, filed on Nov. 9, 2007, the entire disclosure of which is incorporated herein by reference.

The invention claimed is:

1. A power supply controller for controlling power supply from a plurality of solar cell arrays and a battery to a load and controlling charging of the battery using the plurality of solar cell arrays, comprising:
   a plurality of shunt circuits provided so as to correspond to the plurality of solar cell arrays, respectively, for controlling power supply from the corresponding solar cell arrays to the load; and
   one or more charging circuits provided so as to correspond to a part or all of the plurality of solar cell arrays, respectively, for controlling the charging of the battery using the corresponding solar cell arrays,
   wherein the plurality of shunt circuits and the one or more charging circuits are separately and independently operated based on preset threshold values without control by means of common control signals for the plurality of shunt circuits and the charging circuits.

2. A power supply controller according to claim 1, wherein the preset threshold values for the plurality of shunt circuits are set to turn on or off the plurality of shunt circuits one by one based on a change in voltage of a bus connected to the load.

3. A power supply controller according to claim 1, wherein the preset threshold values for the one or more charging circuits are set to turn on or off the one or more charging circuits one by one based on a change in voltage of the battery.

4. A power supply controller according to claim 1, wherein:
   the preset threshold values for the plurality of shunt circuits are set to turn on or off the plurality of shunt circuits one by one based on a change in voltage of a bus connected to the load;
   the preset threshold values for the one or more charging circuits are lower than the preset threshold values for the plurality of shunt circuits and set to turn on or off the one or more charging circuits one by one based on a change in voltage of the battery; and
   the one or more charging circuits are provided, in order from a low threshold value, corresponding to the solar cell arrays provided corresponding to the plurality of shunt circuits in order from a high threshold value.

5. A power supply controller according to claim 1, wherein:
   when a voltage of a bus connected to the load is equal to or larger than a first predetermined value, the one or more charging circuits perform an on-off operation based on a voltage of the battery; and
   when the voltage of the bus is equal to or larger than a second predetermined value higher than the first predetermined value, the plurality of shunt circuits perform an on-off operation based on the voltage of the bus.

6. A power supply controller according to claim 1, wherein at least a part of the plurality of shunt circuits is modularized by one or more shunt circuits as a unit.

7. A power supply controller according to claim 1, wherein the one or more charging circuits are modularized with shunt circuits corresponding to the corresponding solar cell arrays, respectively.

* * * * *